US008972856B2

(12) United States Patent
Channabasavaiah

(10) Patent No.: US 8,972,856 B2
(45) Date of Patent: Mar. 3, 2015

(54) DOCUMENT MODIFICATION BY A CLIENT-SIDE APPLICATION

(75) Inventor: Prashanth Channabasavaiah, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 706 days.

(21) Appl. No.: 12/239,544

(22) Filed: Sep. 26, 2008

(65) Prior Publication Data

US 2010/0083105 A1    Apr. 1, 2010

(51) Int. Cl.
 *G06F 17/30*    (2006.01)
(52) U.S. Cl.
 CPC ...... *G06F 17/3087* (2013.01); *G06F 17/30867* (2013.01)
 USPC ............ 715/273; 715/209; 707/706; 707/707
(58) Field of Classification Search
 CPC ................... G06F 17/30867; G06F 17/3087
 USPC .......................... 715/209, 273; 707/706, 707
 See application file for complete search history.

(56) References Cited

U.S. PATENT DOCUMENTS

| | | | |
|---|---|---|---|
| 4,823,283 A | | 4/1989 | Diehm et al. |
| 4,984,158 A | | 1/1991 | Hillsman |
| 5,579,231 A | | 11/1996 | Sudou et al. |
| 5,619,709 A | * | 4/1997 | Caid et al. ............ 715/209 |
| 5,734,887 A | * | 3/1998 | Kingberg et al. ............ 1/1 |
| 5,771,378 A | | 6/1998 | Holt et al. |
| 5,835,087 A | | 11/1998 | Herz et al. |
| 5,895,470 A | | 4/1999 | Pirolli et al. |
| 6,018,738 A | | 1/2000 | Breese et al. |
| 6,049,776 A | | 4/2000 | Donnelly et al. |
| 6,327,590 B1 | | 12/2001 | Chidlovskii et al. |
| 6,385,351 B1 | | 5/2002 | Simske et al. |
| 6,446,065 B1 | | 9/2002 | Nishioka et al. |

(Continued)

FOREIGN PATENT DOCUMENTS

| | | |
|---|---|---|
| JP | 09-050441 | 2/1997 |
| JP | 2002-215726 | 8/2002 |

(Continued)

OTHER PUBLICATIONS

A Goal-Oriented Web Browser by Alexander Faaborg et al (MIT Media Lab Apr. 2006).*

(Continued)

*Primary Examiner* — William Bashore
*Assistant Examiner* — Nathan Shrewsbury
(74) *Attorney, Agent, or Firm* — Hickman Palermo Truong Becker Bingham Wong LLP; Edward A. Becker

(57) ABSTRACT

A method for modifying a document at a client-side application is disclosed. The method involves receiving a user-requested document at a client-side application from a server; querying a database by the client-side application with entities in the user-requested document, where at least one entity is associated with entity information stored in the database; in response to querying the database, receiving the entity information associated with the at least one entity at the client-side application; modifying the user-requested document at the client-side application to obtain a modified document, where modifying the document comprises adding the entity information or a link to the entity information associated with the at least one entity; and displaying the modified document with the client-side application.

25 Claims, 4 Drawing Sheets

(56) References Cited

U.S. PATENT DOCUMENTS

| | | | |
|---|---|---|---|
| 6,490,579 | B1 | 12/2002 | Gao et al. |
| 6,701,311 | B2 | 3/2004 | Biebesheimer et al. |
| 6,738,763 | B1 | 5/2004 | Suzuki et al. |
| 6,751,780 | B1 | 6/2004 | Neff et al. |
| 6,785,671 | B1 | 8/2004 | Bailey et al. |
| 6,816,857 | B1 | 11/2004 | Weissman et al. |
| 6,853,998 | B2 | 2/2005 | Biebesheimer et al. |
| 6,859,807 | B1 | 2/2005 | Knight et al. |
| 6,931,397 | B1 | 8/2005 | Sundaresan |
| 6,947,930 | B2 * | 9/2005 | Anick et al. ............................ 1/1 |
| 7,028,024 | B1 * | 4/2006 | Kommers et al. ............. 707/718 |
| 7,036,145 | B1 | 4/2006 | Murphy et al. |
| 7,137,077 | B2 | 11/2006 | Iwema et al. |
| 7,243,095 | B2 | 7/2007 | Chang et al. |
| 7,257,794 | B2 | 8/2007 | Tang et al. |
| 7,284,192 | B2 | 10/2007 | Kashi et al. |
| 7,299,424 | B2 | 11/2007 | Jarrett et al. |
| 7,383,155 | B2 | 6/2008 | Rosam et al. |
| 7,689,545 | B2 | 3/2010 | Matsubayashi et al. |
| 7,702,677 | B2 | 4/2010 | Chang et al. |
| 7,941,428 | B2 * | 5/2011 | Huston ........................ 707/722 |
| 7,979,457 | B1 * | 7/2011 | Garman ........................ 707/768 |
| 8,224,814 | B2 | 7/2012 | Olson et al. |
| 2001/0034016 | A1 | 10/2001 | Ziv-el et al. |
| 2002/0040317 | A1 | 4/2002 | Neumeyer et al. |
| 2002/0078029 | A1 | 6/2002 | Pachet |
| 2002/0105532 | A1 * | 8/2002 | Oblinger ........................ 345/701 |
| 2002/0106127 | A1 | 8/2002 | Kodama et al. |
| 2002/0152222 | A1 | 10/2002 | Holbrook |
| 2002/0194199 | A1 | 12/2002 | Flank |
| 2003/0041091 | A1 | 2/2003 | Cheline et al. |
| 2003/0061200 | A1 | 3/2003 | Hubert et al. |
| 2003/0097357 | A1 | 5/2003 | Ferrari et al. |
| 2003/0135582 | A1 * | 7/2003 | Allen et al. ................... 709/217 |
| 2004/0002959 | A1 | 1/2004 | Alpert et al. |
| 2004/0117358 | A1 | 6/2004 | Von Kaenel et al. |
| 2004/0193520 | A1 | 9/2004 | LaComb et al. |
| 2004/0210468 | A1 | 10/2004 | Rubel et al. |
| 2005/0080780 | A1 | 4/2005 | Colledge et al. |
| 2005/0165642 | A1 | 7/2005 | Bronze et al. |
| 2005/0257045 | A1 | 11/2005 | Bushman et al. |
| 2006/0020533 | A1 | 1/2006 | Lee |
| 2007/0061298 | A1 | 3/2007 | Wilson et al. |
| 2007/0168346 | A1 | 7/2007 | Markanthony et al. |
| 2007/0260448 | A1 | 11/2007 | Lorenzen et al. |
| 2009/0235150 | A1 * | 9/2009 | Berry ............................ 715/205 |
| 2010/0070484 | A1 | 3/2010 | Kraft et al. |

FOREIGN PATENT DOCUMENTS

| | | |
|---|---|---|
| JP | 2004-178240 | 6/2004 |
| JP | 2004-220518 | 8/2004 |
| JP | 2005-135148 | 5/2005 |
| WO | WO 2004/114163 A2 | 12/2004 |
| WO | WO 2005/050491 A1 | 6/2005 |

OTHER PUBLICATIONS

Googlepedia: The Ultimate Google Resource, Second Edition by Michael Miller ( Que Pub. Date: Sep. 10, 2007).*

Office Action received in Japanese case 2008-535573 dated Aug. 30, 2010 (6 pages).

Current claims of Japanese case 2008-535573 Dec. 2010 (5 pages).

Finkelstein, L. et al., "Placing Search in Context: The Concept Revisited" 2002 ACM (18 pages).

Sugiyama, K. et al., "Adaptive Web Search Based on User Profile Constructed without Any Effort from Users" WWW2004, May 17-22, 2004 (12 pages).

Budzik, et al., "Anticipating Information Needs: Everyday Applications as Interfaces to Internet Information Resources", Proceedings of the 1998 World Conference of the WWW, AACE Press, 1998, 8 pages.

Budzik, et al., "User interactions with Everyday Applications as Context for Just-in-time Information Access", Proceedings of the 2000 International Conference on Intelligent User Interfaces, ACM Press, 2000, 7 pages.

Budzik, et al., "Information Access in Context", Knowledge Based Systems, Sep. 2001, 17 pages.

Budzik, et al., "Supporting on-line resource discovery in the context of ongoing tasks with proactive software assistants", International Journal of Human-Computer Studies, Jan. 2002, 27 pages.

Budzik, et al., "Anticipating and Contextualizing Information Needs", In Proceedings of the Sixty Second Annual Meeting of the American Society for Information Science, Learned Information Inc., 1999, 13 pages.

Korean Intellectual Property Office, "International Search Report", International application No. PCT/US2007/081421, dated Mar. 27, 2008, 13 pages.

Claims, International application No. PCT/US2007/081421, 4 pages.

The Hyperwords Company, "The Hyperwords Project", located at http://www.hyperwords.net, retrieved on Jan. 15, 2007, copyright 2005/2006, 1 pg.

Vibrant Media, "IntelliTXT Words Engage", located at http://www.intellitxt.com, retrieved on Jan. 15, 2007, copyright 2006, 1 pg.

Budzik et al., "User Interactions with Everyday Applications as Context for Just-in-time Information Access", ACM Press, 2000, 8 pages.

Serif, "PhotoPlus 6.0 Companion", Software Publishing Corporation, 1999, 10 pages.

Sugiyama, Kazunari et al., "Adaptive Web search based on user profile constructed without any effort from users", XP-002434325, International World Wide Web Conference, XX, XX, May 2004, 10 pages.

European Patent Office, "Supplementary European Search Report", application No. EP 05774749, dated Mar. 31, 2009, 7 pages.

Claims, application No. EP 05774749, 9 pages.

Korean Office Action received in Application No. 2007-7005011 dated Sep. 26, 2011 (3 pages).

Korean Current Claims in Application No. 2007-7005011 dated Sep. 2011 (6 pages).

Chinese Office Action received in Application No. 200580032112.4 dated Jan. 6, 2012 (9 pages).

Current Claims in Chinese Application No. 200580032112.4 as of Jan. 6, 2012 (6 pages).

Korean Office Action received in Application No. 2007-7005011 dated Mar. 2, 2012 (1 page).

Current Claims in Korean Application No. 2007-7005011 as of Mar. 2, 2012 (11 pages).

Korean Office Action received in Divisional Application No. 10-2011-7031087 dated Mar. 2, 2012 (1 page).

Current Claims in Korean Divisional Application No. 10-2011-7031087 as of Mar. 2, 2012 (4 pages).

Chinese Office Action received in application serial No. 200680037856.X dated Sep. 7, 2010 (8 pages).

Current Claims of Chinese application serial No. 200680037856.X, Dec. 2010 (5 pages).

* cited by examiner

DOCUMENT MODIFICATION BY A CLIENT-SIDE APPLICATION

CROSS-REFERENCE TO RELATED APPLICATIONS

The present application is related to the following U.S. patent applications, each of which is incorporated by reference herein:

U.S. patent application Ser. No. 10/903,283, filed Jul. 29, 2004, titled "SEARCH SYSTEMS AND METHODS USING IN-LINE CONTEXTUAL QUERIES;"

U.S. patent application Ser. No. 11/033,417, filed Jan. 10, 2005, titled "USER INTERFACES FOR SEARCH SYSTEMS USING IN-LINE CONTEXTUAL QUERIES;"

U.S. patent application Ser. No. 11/033,100, filed Jan. 10, 2005, titled "SEARCH SYSTEMS AND METHODS USING ENHANCED CONTEXTUAL QUERIES;"

U.S. patent application Ser. No. 11/033,101, filed Jan. 10, 2005, titled "USER INTERFACE TOOL FOR TEXT SELECTION;"

U.S. patent application Ser. No. 11/129,096, filed May 12, 2005, titled "SYSTEM AND METHOD FOR CONTEXTUAL TRANSACTION PROPOSALS;"

U.S. patent application Ser. No. 11/183,114, filed Jul. 14, 2005, titled "User ENTERTAINMENT AND ENGAGEMENT ENHANCEMENTS TO SEARCH SYSTEM;"

U.S. patent application Ser. No. 11/231,632, filed Sep. 20, 2005, titled "SYSTEMS AND METHODS FOR PRESENTING INFORMATION BASED ON PUBLISHER-SELECTED LABELS;"

U.S. patent application Ser. No. 11/232,270, filed Sep. 20, 2005, titled "SYSTEMS AND METHODS FOR PRESENTING ADVERTISING CONTENT BASED ON PUBLISHER-SELECTED LABELS;"

U.S. patent application Ser. No. 11/239,708, filed Sep. 29, 2005, titled "TAGGING OFFLINE CONTENT WITH CONTEXT-SENSITIVE SEARCH-ENABLING KEYWORDS;"

U.S. patent application Ser. No. 11/239,729, filed Sep. 29, 2005, titled "AUTOMATICALLY DETERMINING TOPICAL REGIONS IN A DOCUMENT;"

U.S. patent application Ser. No. 11/248,738, filed Oct. 11, 2005, titled "ENABLING CONTEXTUALLY PLACED ADS IN PRINT MEDIA;" and U.S. patent application Ser. No. 11/270,917, filed Nov. 10, 2005, titled "WORD SENSE DISAMBIGUATION;"

U.S. patent application Ser. No. 11/584,403, filed Oct. 19, 2006, titled "CONTEXTUAL SYNDICATION PLATFORM".

FIELD OF THE INVENTION

The present invention relates to automatic document modification. Specifically, the present invention relates to a client-side application automatically modifying a document subsequent to receiving the document from a server.

BACKGROUND

Generally, a client-side application receives a request from a user for a document and queries a server for the user-requested document. The server obtains or generates the document and provides the document to the client-side application. In some cases, the server, prior to sending the document to the client-side application, enhances each document based on metadata associated with the document. For example, one or more entities (e.g., text corresponding to a person, event, etc.) within the document may be associated with metadata which is also stored at the server. Based on the metadata, the server may enhance an entity within the document by modifying the entity or adding content based on the metadata associated with the entity.

According to one such technique, when a web page is requested by a client, a server may add to the web page user interface elements (e.g., a search button) that, when activated, cause a search engine to provide search results that are directed to a particular topic to which the enhanced portion of the web page pertains. For example, a web page may mention the "Eiffel Tower". When the web page is requested, the server may add a search button to the web page next to the mention of the Eiffel Tower. With this technique, a user can presume that, if he initiates a search using a user interface element (e.g., a search button) that is positioned in close proximity to a particular paragraph of text, then the search results obtained for the search will be constrained based on the topics to which the paragraph pertains.

Beneficially, the adaptation of the document by the server presents every user requesting that document with the enhanced content added by the server. Since the adaptation is made at the server and presented to every user, the resulting enhancement may be said to be server-executed and user-agnostic. Each user can locate the entity-related resources without redirecting his browser to a search engine portal page and, sometimes, without even formulating or typing any search query terms. Thus, the user-agnostic enhancement by the server can enable the delivery of entity information, by the server to a client-side application at the point of the user's inspiration or curiosity.

To date, such document enhancement is performed at the server side and accordingly, the documents are user-agnostically enhanced for every user and are transmitted to the client-side application for display to a user. As a result, the client-side application provides the functionality for requesting documents, receiving documents, and displaying documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
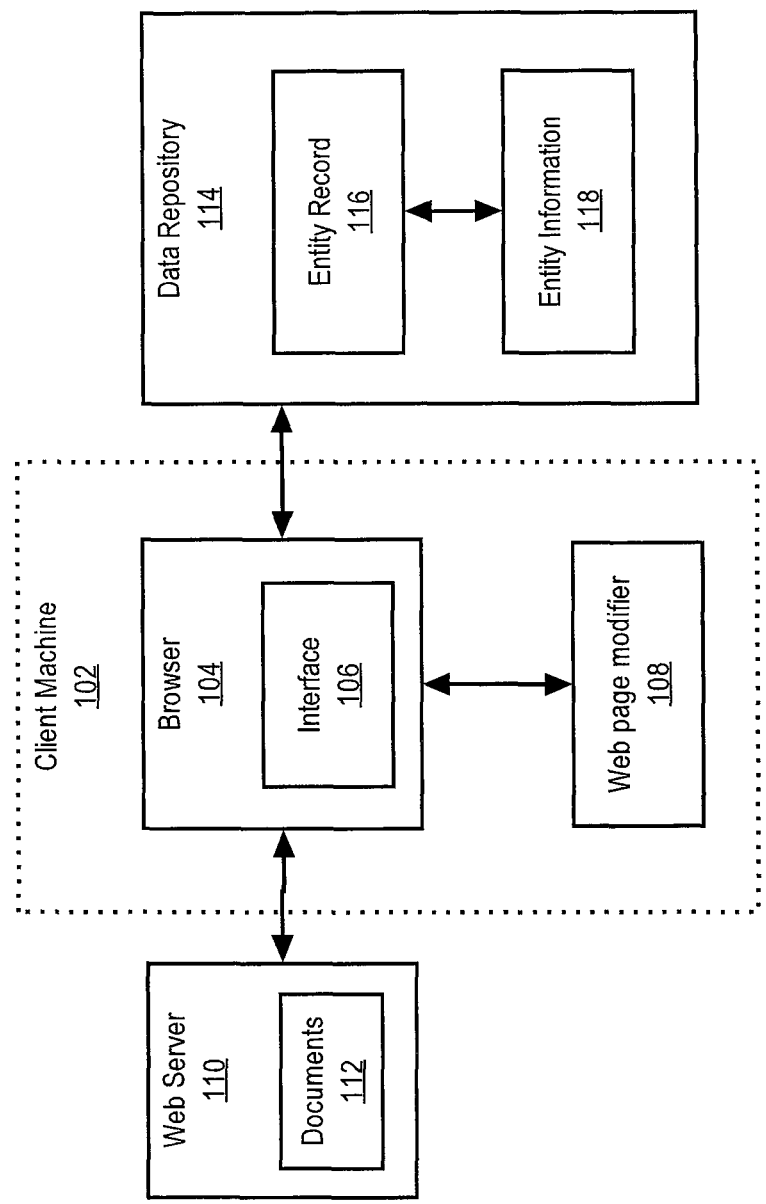
FIG. 1 depicts an example of a system in accordance with one or more embodiments of the invention.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

As mentioned above, there are many circumstances in which documents (e.g., web pages, spreadsheets, text documents, slides, image files, etc.) that include one or more entities (e.g., text, images, symbols, etc.) are received for display at a client-side application from a server in response to a first query by the client-side application for a document or data. Techniques are provided here for allowing the client-side application to search the documents received to identify entities within the documents. The client-side application may further obtain entity information about the identified entities (e.g., with a second query from a local or external data repository). Based on the obtained entity information about the identified entities in the documents, the client-side application may modify the documents and present the modified documents to a user. Such client-side enhancement of the documents may be performed instead of or in addition to any server-side enhancements.

Embodiments of the invention may enable execution of successive queries by a client-side application based on a single request for a document from a user. The successive queries may be used to obtain the document and further obtain entity information associated with entities within the document. The document may be modified by the client-side application to include or link to entity information to obtain a modified document. The document modification may be selected based on the data available at the client system and accordingly, may be particularly relevant to a user or the client system. Thus, the client-side enhancement may be a user-customized enhancement, in contrast to the client-agnostic enhancement that may occur on the server-side. The modified document may be presented to the user instead of the document originally requested by the user.

System Architecture and Functionality

Although a specific computer architecture is described to perform the techniques described herein, embodiments of the invention are applicable to any architecture that can be used to modify search results based on user selections within the search results themselves.

FIG. 1 shows a system (100) in accordance with one or more embodiments of the invention. As shown in FIG. 1, the system (100) includes a client machine (102), a web server (110), and a data repository (114).

In one or more embodiments of the invention, the data repository (114) corresponds to any data storage device (e.g., local memory on the client machine (102) itself, one or more servers connected over the internet, systems within a local area network, a memory on a mobile device, etc.) known in the art which may be searched for entities (116) to obtain entity information (118). In one or more embodiments of the invention, access to the data repository (114) may be restricted and/or secured. As such, access to the data repository (114) may require authentication using passwords, secret questions, personal identification numbers (PINs), biometrics, and/or any other suitable authentication mechanism. Those skilled in the art will appreciate that elements or various portions of data stored in the data repository (114) may be distributed and stored in multiple data repositories (e.g., servers across the world). In one or more embodiments of the invention, the data repository (114) includes flat, hierarchical, network based, relational, dimensional, object modeled, or data files structured otherwise. For example, data repository (114) may be maintained as a table of a SQL database. In addition, data in the data repository (114) may be verified against data stored in other repositories.

Entities (116) correspond to any document content that is associated with entity information (118). Examples of entities (116) include, but are not limited to, text, images, symbols, etc. corresponding to a person, place, event, thing, occupation, service, characteristic, verb, noun, etc. The entity information (118) may be any information related to the entity (116). Examples of entity information (118) may include, but are not limited to, definition of the entity, map of the entity, phone number associated with the entity, business type associated with the entity, history of the entity, children of the entity, availability of the entity, services provided by the entity, address of the entity, etc.

Examples of entity and entity information may include, but are not limited to:

| Entity | Entity Information |
| --- | --- |
| Hotel | "Hotels in the area include: Night Inn, Hotel 5, etc." |
| Rose | An image of a rose |
| Alberto's Restaurant | "333 E. Main St., San Jose, CA 95133," and an Image of a map |
| Bill Clinton | "President of the United States from 1992-2000. Biography . . ." |
| Laptop | "Computer Store XYZ has laptop sales" |
| Picture of China | "Most populous country in the world. |China Tours 555-555-5555" |
| Anger | "Emotional State ranging from minor irritation to intense rage . . ." |
| Whale | "A whale is a mammal, different types of whales include . . ." |
| Terminator | "Terminator is a movie starring Arnold . . ." |

In one or more embodiments, the web server (110) corresponds to hardware and/or software that is used to manage (e.g., generate, modify, store, delete, etc.) documents (112). The web server (110) may be connected to one or more databases (not shown) which may be searched by the web server (110) to obtain the documents (112). The web server (110) may include functionality to accept document or data requests (e.g., HTTP requests) from the client machine (102). In response to the request, the web server (110) may provide one or more documents (112) to the client machine (102). In an embodiment, the documents (112) stored on the web server (110) may correspond to web pages, spreadsheets, text documents, slides, images, a combination thereof or any other suitable file type containing data requested by a user. Each document (112) may include one or more entities (116), described above.

In an embodiment, the client machine (102) corresponds to any system that includes functionality to obtain a document (112) from the web server (110), modify the document (112) with entity information (118) and present the modified document to a user. As shown in FIG. 1, the client machine (102)

includes a browser (104), an interface (106), and a web page modifier (108). The interface (106) corresponds to any sort of interface adapted for use to access the system and any services provided by the system in accordance with one or more embodiments of the invention. The interface (106) may be a web interface, graphical user interface (GUI), command line interface, or other interface accessible through a computer system. The interface (106) may include functionality to allow a user (or an automated equivalent) to enter a search criteria (including words, numbers, symbols, selections, or other suitable input) to request data, select a link on a web page, or otherwise request a document (112). The interface may further include functionality to display a modified document in response to receiving a document request from a user. In an embodiment, the interface (106) is displayed within a browser (104).

The browser (104) corresponds to a client-side application executing on the client machine (102) (such as personal computers (PCs), mobile phones, personal digital assistants (PDAs), and/or other digital computing devices of the users) or a client-side application executed remotely in conjunction with the client machine (102). The browser (104) may be a web browser application or an application for locally browsing the client machine (102) and/or local network. The browser (104) may be used for requesting and receiving a document (112) from the web server (110) that was requested by a user or includes data requested by a user. For example, based on a selection of a link from a user, the browser (104) may generate an HTTP request for a web page corresponding to the link and provide the HTTP request to the web server (110). In an embodiment, the browser (104) (or a component within the browser such as a toolbar) may include functionality to identify entities (116) within a document (112) received from the web server (110). For example, the browser (104) may include functionality to scan the document for text, images, symbols, or other objects within the document (112) and determine if the objects match a predetermined entity (116) stored in the data repository (114). The browser (104) may also include functionality to query the data repository (114) using an entire document (112) to determine if any text, image, graphic, symbol, etc. within the document (112) match an entity (116) associated with entity information (118) within the database.

In an embodiment, the browser (104) at the client-side may include functionality to perform successive searches initiated at the client machine (102) based on a single user request. For example, the browser (104) may include functionality to first perform a search to obtain the document (112) requested by the user, and thereafter the browser may perform additional searches for information related to content within the document (112). In an embodiment, the browser (104) may include functionality to perform any number of successive searches to obtain data related to the content within the document (112). For example, the browser (104) may first search for a web page associated with a movie "Old Yeller." Upon receiving the web page, the browser (104) may query the data repository (114) resulting in identification of an entity "Dog" and receiving information associated with types of dogs including a golden retriever. Thereafter, the browser (104) may again query the data repository (114) for information related to a golden retriever. In an embodiment, the browser (104) may be configured for a minimum and/or maximum number of successive queries for each document (112) requested by a user.

In an embodiment, the document modifier (108) corresponds to software and/or hardware components for modifying documents (112) received from the web server (110) prior to presenting the documents (112) on the interface (106). The document modifier (108) may be a part of the browser (104) or may be a separate component, such as a plug-in or client-side proxy server.

In an embodiment, the web page modifier (108) includes functionality to modify documents (112) based on entity information (118) associated with entities (116) within a document (112). For example, the web page modifier (108) may include functionality to add links to entities within the document (112), add interface elements (e.g., buttons, input fields, text, images, etc.) to the document (112), or otherwise modify the document to directly include the entity information (118) or link to the entity information (118) associated with an entity (116) within the document (112).

Each of these components described above may be located on the same device or may be located on separate devices coupled by a network (e.g., Internet, Intranet, Extranet, Local Area Network (LAN), Wide Area Network (WAN), etc.), with wire and/or wireless segments. In one or more embodiments, the web server (110) and the client machine (102) are implemented using a client-server architecture. The web server (110) may be an enterprise application running on one or more servers, and in some embodiments could be a peer-to-peer system. In one or more embodiments of the invention, the client machine (102) is accessible over a network connection (not shown), such as the Internet, by one or more users. Information and/or services provided by the client machine (102) may also be stored and accessed over the network connection.

Document Modification at Client-Side Application

Figure 2:
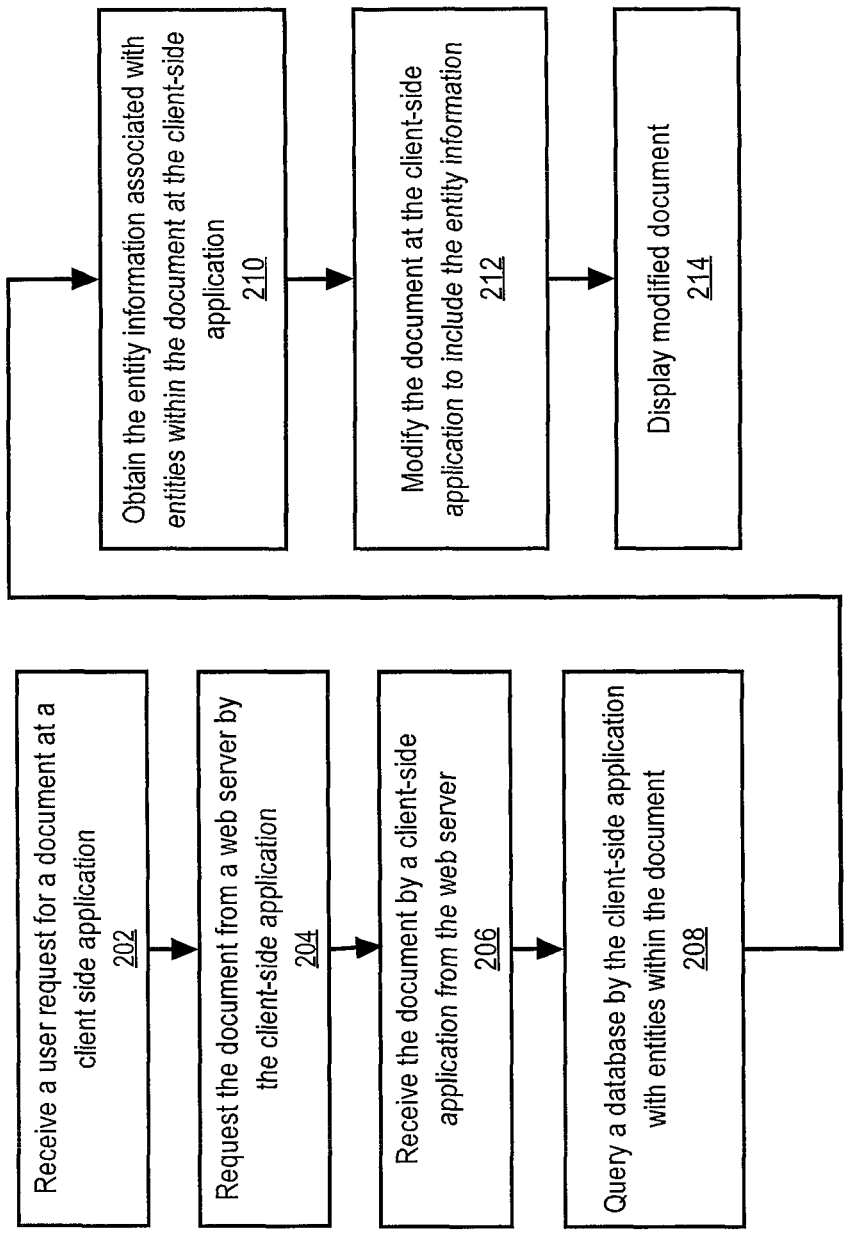
FIG. 2 illustrates an example of a flow diagram in accordance with one or more embodiments of the invention.

FIG. 2 shows a flowchart for document modification at a client-side application subsequent to receiving the document from a web server in accordance with one or more embodiments. In one or more embodiments, one or more of the steps described below may be omitted, repeated, and/or performed in a different order. Accordingly, the specific arrangement of steps shown in FIG. 2 should not be construed as limiting the scope of the invention.

Initially, a document request is received from a user at a client-side application in accordance with an embodiment of the invention (Step 202). The document request may be received by the user selecting a link, requesting a search by providing search terms, requesting a download of a particular document, or otherwise providing input requesting data.

In an embodiment, the client-side application makes a first request to a web server for the user-requested document (Step 204). The client-side application may identify the particular document in the request, may provide the search terms provided by the user to the web server, or may otherwise request data from the web server that is requested by a user. In response, the client-side application receives the requested document from the web server (Step 206). The document received from the web server may be associated with metadata identifying the entities within the document. In an embodiment, the requested document may comprise entities without any additional information related to the entities. The client-side application may execute code to identify the contents of the document and further may identify one or more entities within the document. For example, the client-side application may execute an optical character scan of an image to identify text within the image. The identified text, images, symbols, etc. or other content may be compared to locally stored dictionaries to determine whether the content corresponds to a predetermined entity. The client-side application may also query a data repository providing the document as input to identify entities within the document.

In an embodiment, a database is queried by the client-side application, using entities within the document as search terms, to request entity information (Step 208). The database may be queried by the client-side application with specific entities identified at the client-side application. The database may also be queried by the client-side application using, as input to the search, the entire document received from a web server. In an embodiment, the second query by the client-side application is successive to the query for the user requested-document because the contents of the user-requested document or the user-requested document itself, is input for the second query. Accordingly, the client-side application performs successive queries based on a single request from a user where the result of a first query by the client-side application is used as an input for a second query by the client-side application.

In response to the successive query for entity information associated with entities within the document, entity information is obtained from the data repository at the client-side application (Step 210). Entity information may be received in the form of metadata, may be embedded within the user-requested documents (e.g., when the documents themselves are used as query inputs), may be received in pairs with corresponding entities, may be received as links (e.g., pathways to the entity information rather than the entity information itself), or otherwise obtained. In an embodiment, executable code that results in the generation of entity information may be obtained. For example, entity information may correspond to code that incorporates entities as input for search engines which are activated upon selection of the entity information. In another example, an entity may correspond to the name of a business and entity information may correspond to executable code that provides the address of the business as an input to a mapping application that results in a map of the business upon selection of the entity information. The map of the business may also be generated prior to selection and simply provided to the client-side application for local storage or for direct incorporation into the document with the hotel.

Next, the user-requested document obtained from the web server is modified at the client-side application to include the entity information (or a link to the entity information) to obtain a modified document (Step 212) and displayed (Step 214), in accordance with one or more embodiments. The entities within the document may be modified to include the links corresponding to the respective entity information. For example, text or an image identified as an entity may be modified such as that the text or image links to another web page with information related to the text or image. In another embodiment, entity information may be embedded into a document such that hovering over the entity causes a display of the entity information. For example, a document comprising the name of a politician may be modified such that hovering over the politician's name displays a biography of the politician. In another embodiment, a paragraph related to a place may be identified as an entity and an interface element (e.g., button with "read more") may be added to the end of the paragraph that links to more information with similar subject matter as the paragraph. In an embodiment, entities that are found within a web page that are modified to include embedded entity information or links to entity information are also modified with a visualization that indicates availability of the entity information. The visualization for the entity may include any visible addition to the entity that may be constantly displayed or activated by hovering over the entity. Visualizations may include highlighting, underlining, coloring, shading, blinking, or any other suitable indication of additional information.

Separate Listing of Entities

In an embodiment, a document with recognized entities and corresponding entity information may be modified to include a separate listing of recognized entities. For example, in a web page, all recognized entities from the web page may be listed in a separate frame or window within the web page. The separate listing of the entity within the web page may link to the location of the entity within the web page or may link to external documents (e.g., other web pages) with information related to the entity.

Selection of Entities for Including Entity Information

In an embodiment, modification of the document may involve inclusion of entity information for only particular entities. The client-side application may select which entities are to be associated with entity information based on information available on the local machine executing the client-side application or based on the user of the client-side application. For example, entities may be identified into classes or types and entities of a particular type may be selected for modification to include entity information. In an embodiment, the client-side application may be configured by a user to include entity information for certain entity types and/or not include entity information for entity types. For example, the user may configure the client-side application to modify the document to include a time and place for recognized events, however not modify the document for recognized persons. In another embodiment, the selection of the entity for entity information inclusion may depend on the geographic location of a system executing the client-side application. For example, the client-side application may include a map for all entities within a specified vicinity (e.g., a specified mile radius, a city, a town, etc.) associated with a client system executing the client-side application. The client-side application may also provide directions from the location of the client system or a default location set by a user to the entities when the entities are within the specified vicinity. The client-side application may also include entity information for recognized events based on time. For example, a user may select vacation dates that the user is available. Accordingly, the client-side application may filter event entities based on the vacation dates and only embed a document with event information if the event occurs during the vacation dates specified by the user. In another embodiment, the entity recognition may be based on a browsing history, files, or other data on a client system executing the client-side application. For example, the entities found within a document may be compared to data on the client system and entities that are found on the client system may further be queried by the client-side application to find and embed corresponding entity information. Accordingly, embodiments of the invention allow for selection of particular entities for inclusion of entity information based on the client system executing the client-side application or based on a user's preferences. In an embodiment, the client-side application modifying the documents may be a web application which saves the configuration of a user and allows a user to browse the internet after logging in using any system. A user's configuration and/or preferences for document modification may be stored on a server and provided to the client-side application executing on the machine the user is currently using. Accordingly, a user's configuration and/or preferences for document modification may be portable.

Selection of Entity Information

In an embodiment, the entity information embedded into the document may be selected out of all available entity information based on data available to the client-side application or based on user preferences obtained by the client-side application. Any of the selection methods used for selecting entities, described above, may also be used to select entity information to embed into a document. For example, user preferences, browsing history, local data, geographic location of system executing the client-side application etc. may be used in selection of entity information that is embedded into a document.

In an embodiment, entity information selection may be based on the source of the entity information. For example, one or more sources of entity information may be included and/or excluded for selection of entity information. The exclusion/inclusion of a source may be user configured or based on an algorithm. For example, a source may be used if a minimum amount of users use the source, such as a minimum level of network traffic on a website. In another example, a source ranked first by a search engine may be used as the source for the entity information. In an embodiment, a trusted source listing may be created by an independent third party or by a user which lists all sources to be used for entity information. The sources used for entity information may also be prioritized. For example, entity information may first be queried at a source with the highest priority. If entity information is not found, then the next highest priority source may be queried for the information. In an embodiment, the client-side application sets the priority of sources based on the number of times the user of the client-side application has used the source. For example, if a user frequently visits a web site the client-side application will be configured to query the trusted source for entity information. Conversely if a user has blocked a source or has received corrupted data, destructive data (e.g., a worm, a virus, etc.), etc. from a source, the source may not be queried by the client-side application for entity information. Accordingly, the source for entity information may be selected by the client-side application based on a user's history, preferences, etc. In an embodiment, a suitable source for entity information may be listed in metadata associated with a document. The metadata may be searched to determine the suitable source for information related to the entity and the source may be queried for entity information or links to the source may be added to the document.

EXAMPLE

Figure 3:
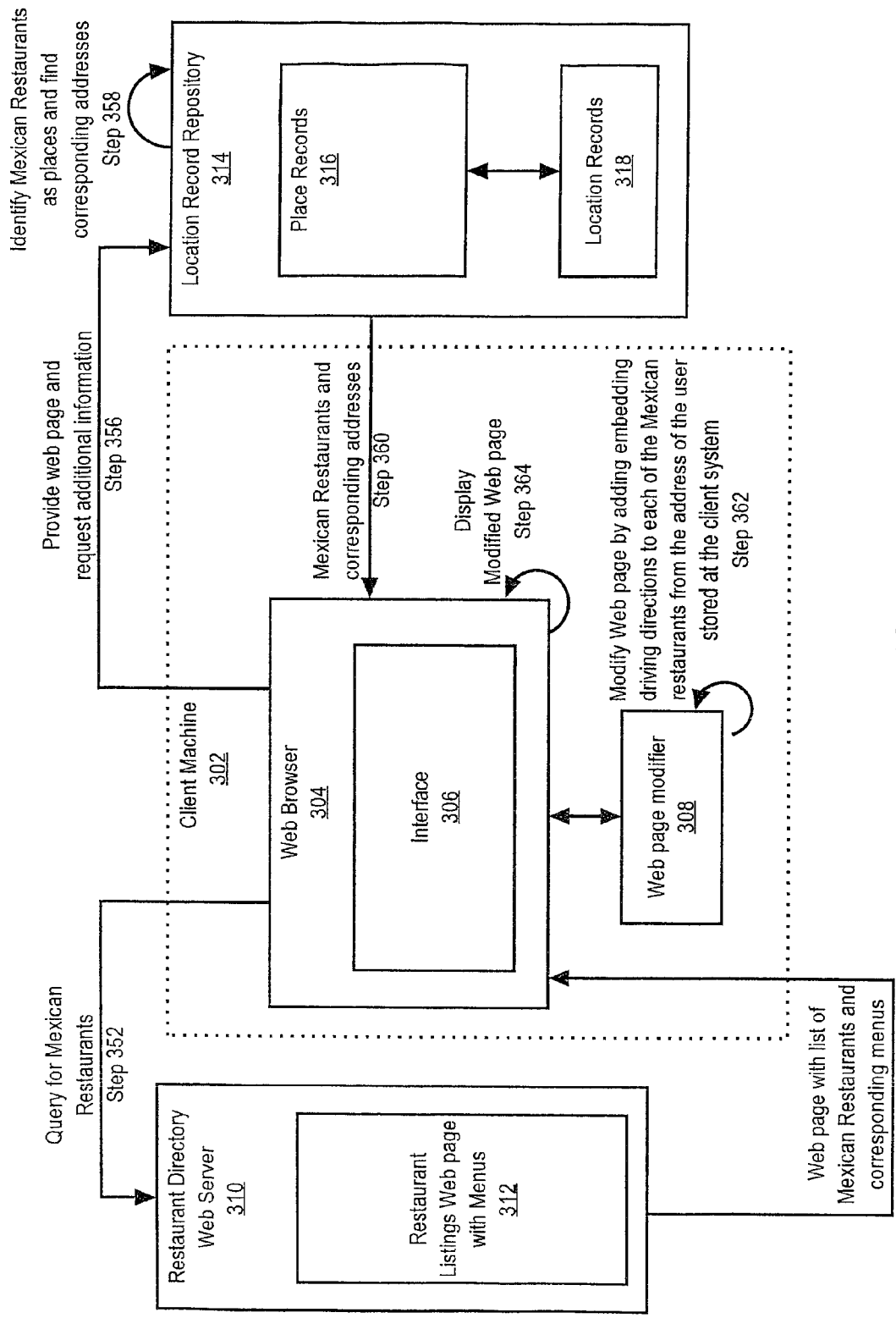
FIG. 3 illustrates an example in accordance with an embodiment of the invention.

FIG. 3 shows an example of document modification at a client-side application subsequent to receiving the document from a web server in accordance with one or more embodiments. The components and steps described in FIG. 3 are related to an example and should not be construed as limiting the scope of the invention in any manner.

Initially, the interface (306) within the browser (304) executing on the client machine (302) receives a request for a restaurant listings from a user. In Step 352, the web browser (304) queries the restaurant directory web server (310) for a list of Mexican restaurants. In Step 354, the restaurant directory web server (310) returns the restaurant listings web page with menus (312) to the browser (304). In Step 356, the browser (304) queries a location record repository (314) with the restaurant listings web page with menus (312) to search for additional information. In Step 358, the location record repository (314) matches the Mexican restaurants listed in the web page with the place records (316) and finds the associated location records (318) that include the addresses for the Mexican restaurants. In Step 360, the Mexican restaurants and corresponding addresses are sent to the web browser (304). Next, in Step 362, the web page modifier (308) modifies the restaurant listing web page with menus (312) to embed directions (e.g., pop up window activated by hovering) to each of the Mexican restaurants based on the address of the Mexican restaurants received from the location record repository (314) and the address of the user stored at the client machine (302). In Step 364, the interface (306) displays the modified web page with the embedded directions instead of the original restaurant listings web page with menus (312) that was received from the restaurant directory web server (310).

Hardware Overview

Figure 4:
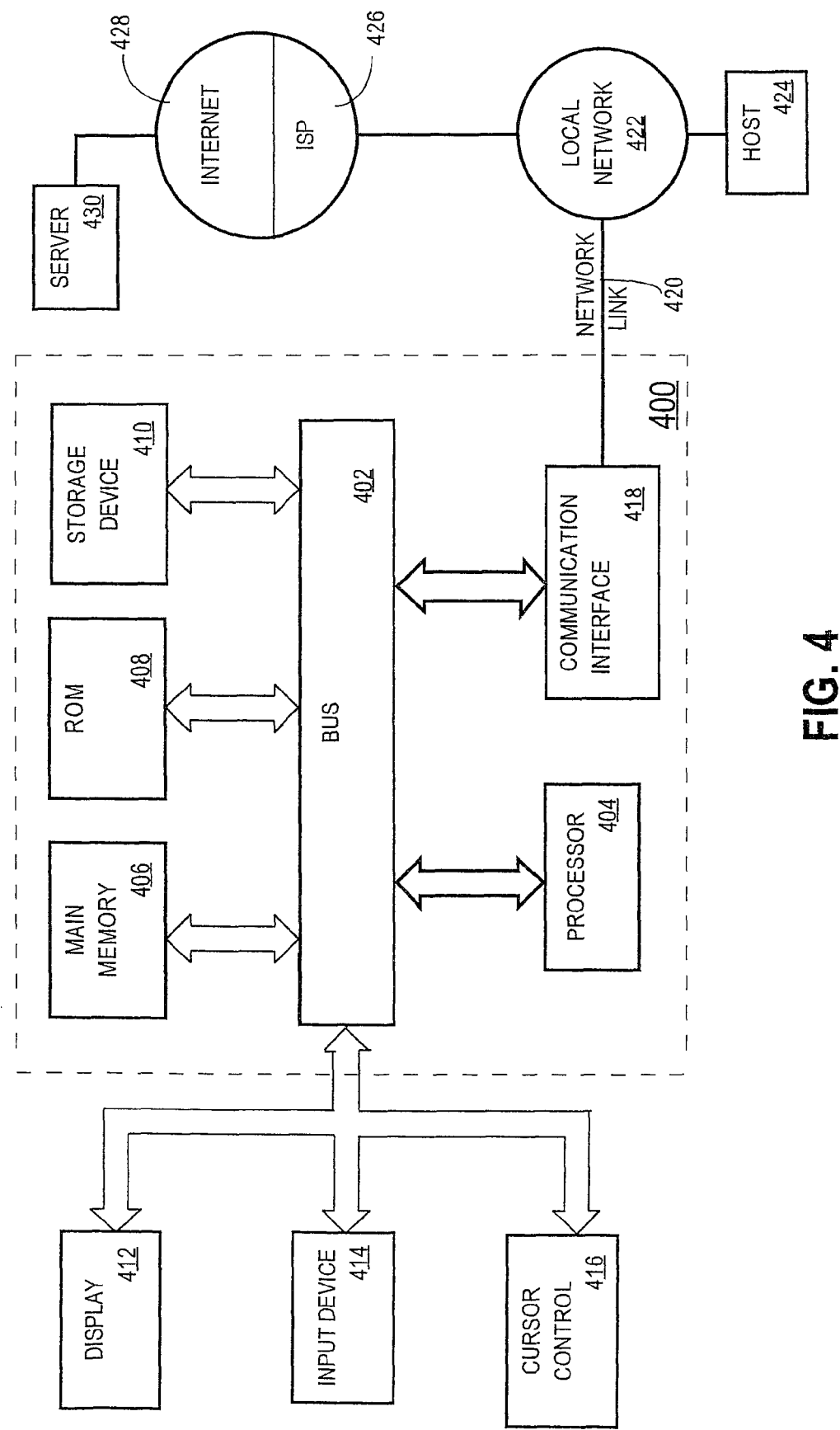
FIG. 4 depicts a block diagram of a computer system on which one or more embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   a client-side application executing on a client machine receiving a request from a user for a user-requested document;
   in response to the client-side application executing on the client machine receiving the request from the user for the user-requested document, the client-side application executing on the client machine requesting the user-requested document from a server;
   the client-side application executing on the client machine receiving the user-requested document from the server;
   in response to the client-side application executing on the client machine receiving the user-requested document from the server, instead of displaying the user-requested document at the client machine executing the client-side application:
      identifying one or more entities in the user-requested document;
      querying a database based on the one or more entities in the user-requested document, wherein at least one entity of the one or more entities is associated with entity information stored in the database, wherein the entity information stored in the database comprises data identifying one or more locations for the at least one entity, and the one or more entities are identified in the user-requested document based upon proximity to a location;
      in response to querying the database, receiving the entity information associated with the at least one entity;
      at the client machine, creating a modified document by adding to the user-requested document (a) the entity information associated with the at least one entity or (b) a link to the entity information associated with the at least one entity; and
      displaying the modified document with the client-side application instead of the user-requested document received at the client-side application from the server;
   wherein the method is performed by a client machine executing the client-side application.

2. The method of claim 1, wherein the entity information comprises a time window, and wherein the one or more entities are selected from the user-requested document based on a time associated with the one or more entities within the time window.

3. The method of claim 1, further comprising: selecting a portion of the entity information for modifying the user-requested document, wherein the portion of the entity information is selected based on a trusted source of the portion of the entity information.

4. The method of claim 3, wherein the trusted source is determined based on data stored at the client machine executing the client-side application.

5. The method of claim 3, wherein selecting the portion is further based on a priority of the trusted source compared to a priority for a plurality of trusted sources.

6. The method of claim 1, wherein creating the modified document comprises adding a separate listing of recognized entities associated with entity information.

7. The method of claim 1, further comprising: performing a successive query using the entity information to query the database by the client-side application for additional information.

8. The method of claim 7, wherein the client-side application is limited by a minimum number of successive queries or a maximum number of successive queries.

9. The method of claim 1, wherein the client-side application is a web browser comprising at least one toolbar.

10. The method of claim 1, wherein the at least one entity comprises a place, and wherein the entity information comprises a map associated with the place or directions to the place from a location associated with the client machine executing the client-side application.

11. One or more non-transitory computer readable storage media storing instructions, which when processed by one or more processors cause:
   a client-side application executing on a client machine receiving a request from a user for a user-requested document;
   in response to the client-side application executing on the client machine receiving the request from the user for the user-requested document, the client-side application executing on the client machine requesting the user-requested document from a server;
   the client-side application executing on the client machine receiving the user-requested document from the server;
   in response to the client-side application executing on the client machine receiving the user-requested document from the server, instead of displaying the user-requested document at the client machine executing the client-side application:
      identifying one or more entities in the user-requested document;
      querying a database based on the one or more entities in the user-requested document, wherein at least one entity of the one or more entities is associated with entity information stored in the database, wherein the entity information stored in the database comprises data identifying one or more locations for the at least one entity, and the one or more entities are identified in the user-requested document based upon proximity to a location;
      in response to querying the database, receiving the entity information associated with the at least one entity;
      at the client machine, creating a modified document by adding to the user-requested document (a) the entity information associated with the at least one entity or (b) a link to the entity information associated with the at least one entity; and
      displaying the modified document with the client-side application instead of the user-requested document received at the client-side application from the server.

12. The one or more non-transitory computer readable storage media of claim 11, wherein the entity information comprises a time window, and wherein the one or more entities are selected from the user-requested document based on a time associated with the one or more entities within the time window.

13. The one or more non-transitory computer readable storage media of claim 11, wherein the instructions include instructions which, when processed by the one or more processors further cause: selecting a portion of the entity information for modifying the user-requested document, wherein the portion of the entity information is selected based on a trusted source of the portion of the entity information.

14. The one or more non-transitory computer readable storage media of claim 13, wherein the trusted source is determined based on data stored at a client machine executing the client-side application.

15. The one or more non-transitory computer readable storage media of claim 13, wherein selecting the portion is further based on a priority of the trusted source compared to a priority for a plurality of trusted sources.

16. The one or more non-transitory computer readable storage media of claim 11, wherein modifying the document to obtain the modified document comprises adding a separate listing of recognized entities associated with entity information.

17. The one or more non-transitory computer readable storage media of claim 11, wherein the instructions include instructions which, when processed by the one or more processors further cause: performing a successive query using the entity information to query the database by the client-side application for additional information.

18. The one or more non-transitory computer readable storage media of claim 17, wherein the client-side application is limited by a minimum number of successive queries or a maximum number of successive queries.

19. The one or more non-transitory computer readable storage media of claim 11, wherein the client-side application is a web browser comprising at least one toolbar.

20. The one or more non-transitory computer readable storage media of claim 11, wherein the at least one entity comprises a place, and wherein the entity information comprises a map associated with the place or directions to the place from a location associated with a client system executing the client-side application.

21. The method of claim 1, wherein displaying the modified document comprises displaying the entity information at a selected location within the modified document.

22. The method of claim 1, wherein modifying the user-requested document comprises adding the entity information to the user-requested document, and wherein adding the entity information to the user-requested document comprises embedding the entity information in the user-requested document such that hovering over the entity in a display of the modified document causes a display of the entity information.

23. The one or more non-transitory computer readable storage media of claim 11, wherein displaying the modified document comprises displaying the entity information at a selected location within the modified document.

24. The one or more non-transitory computer readable storage media of claim 11, wherein modifying the user-requested document comprises adding the entity information to the user-requested document, and wherein adding the entity information to the user-requested document comprises embedding the entity information in the user-requested document such that hovering over the entity in a display of the modified document causes a display of the entity information.

25. An apparatus comprising:
   a client-side application configured to:
      receive a request from a user for a user-requested document,
      in response to receiving the request from the user for the user-requested document, request the user-requested document from a server,
      receive the user-requested document from a server; and
   a Web page modifier configured to, in response to the client-side application receiving the user-requested document from the server instead of the user-requested document being displayed at the apparatus:
      identify one or more entities in the user-requested document;
      query a database based on the one or more entities in the user-requested document, wherein at least one entity of the one or more entities is associated with entity information stored in the database, wherein the entity information stored in the database comprises data identifying one or more locations for the at least one entity, and the one or more entities are identified in the user-requested document based upon proximity to a location;
   in response to querying the database, receiving the entity information associated with the at least one entity;
   create a modified document by adding to the user-requested document (a) the entity information associated with the at least one entity or (b) a link to the entity information associated with the at least one entity; and
   cause the client-side application to display the modified document instead of the user-requested document received by the client-side application from the server.

* * * * *